Patented Oct. 29, 1935

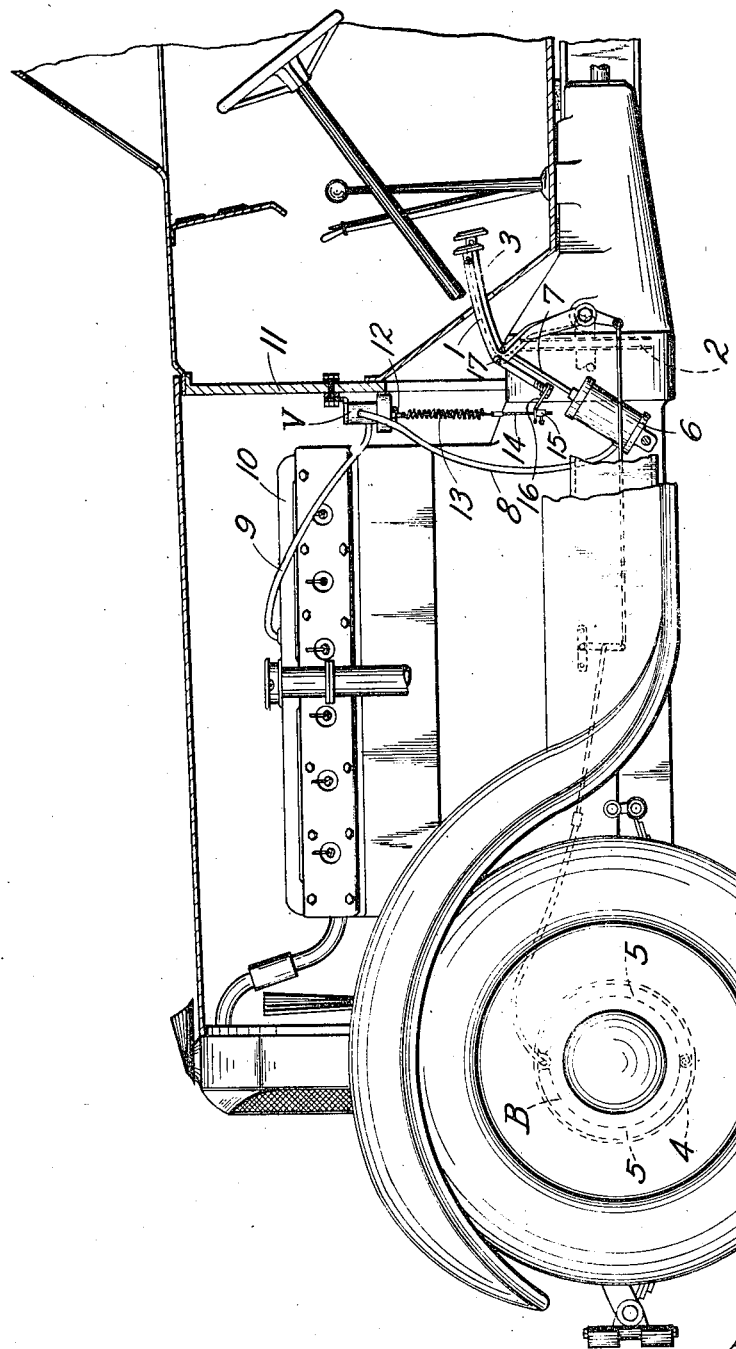

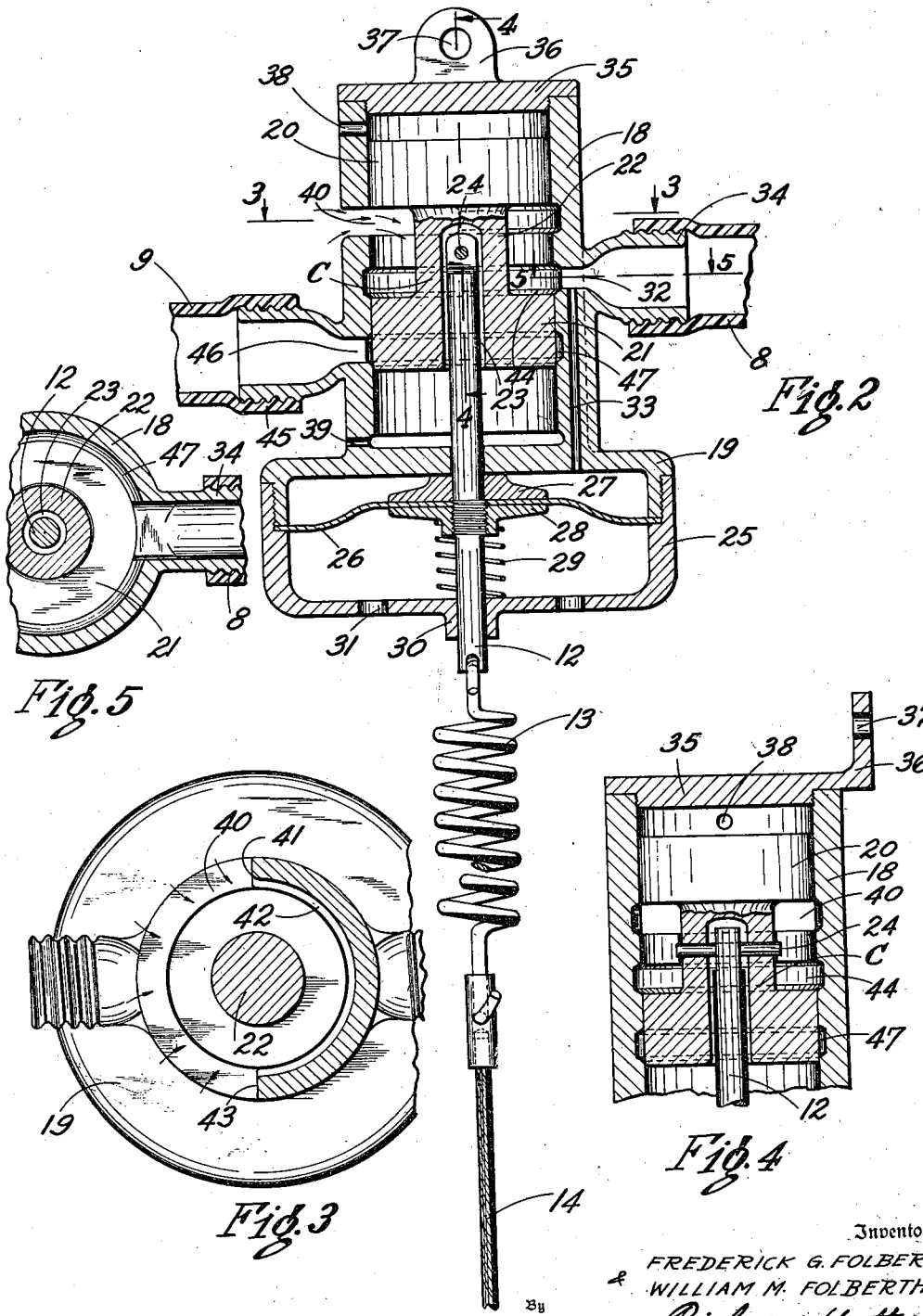

2,018,844

UNITED STATES PATENT OFFICE 2,018,844

CONTROL APPARATUS FOR FLUID PRESSURE ACTUATED DEVICES

Frederick G. Folberth and William M. Folberth, Cleveland, Ohio

Application July 28, 1932, Serial No. 625,502

4 Claims. (Cl. 303—54)

This invention relates to fluid pressure actuated devices and more particularly to control mechanism for controlling the flow of actuating fluid to the cylinder, diaphragm chamber or the like of such apparatus.

In our co-pending United States patent application, Serial No. 483,328, filed September 20, 1930, we have described and claimed an improved type of fluid pressure actuated apparatus for operating the brakes of a motor vehicle. In the present application we have illustrated our improved control mechanism as applied to a vehicle brake operating system of the general type shown in our above noted application. It will be understood, however, that our improved control apparatus is adapted for many other uses than that herein shown and described.

In the operation of fluid pressure actuated brakes for vehicles it is extremely important that a smooth and sensitive brake operation be obtained. It is also important that the brake operating apparatus be uniformly effective under all conditions and at all points in its brake controlling movements.

To control the flow of actuating fluid to and from the cylinder of fluid pressure brakes and the like a number of different kinds of valves have been proposed. It is among the objects of our invention to provide a valve for controlling the flow of fluid which is absolutely balanced in that the frictional resistance to movement of the valve is maintained at substantially constant value at all points in its movement and under all operating conditions and in which the fluid pressure being controlled will not affect the force required to operate the valve except as hereinafter explained.

Other objects of our invention are: the provision of a control valve, particularly adapted for use in connection with fluid pressure actuated brakes, which is of rugged and substantial construction and which may be economically manufactured; the provision of a control mechanism for vehicle brakes which may be conveniently installed on any standard type of automotive vehicle and which, after installation, requires a minimum of upkeep and attention; the provision of a control valve for fluid pressure actuated brakes which will give the desired smooth and gradual brake application; the provision of a control valve and fluid pressure actuated brakes and connections for operating the valve whereby an instantaneous brake applying and releasing action is obtained; the provision of a control valve for fluid pressure actuated devices in which the fluid passages are of large area thus permitting practically instantaneous changes in the fluid pressure conditions and eliminating harmful resistance to flow of the operating fluid and at the same time providing a valve structure which occupies a minimum of space for its capacity.

Other objects of our invention will appear from the following description, reference being had to the accompanying drawings, in which—

Figure 1 is a fragmentary sectional side elevation of the front portion of an automobile showing our fluid pressure control apparatus applied to control the operation of the brakes of the automobile.

Figure 2 is a vertical cross section of the control valve shown in Figure 1.

Figure 3 is a plan section of our control valve taken on line 3—3 of Figure 2.

Figure 4 is a fragmentary cross sectional view illustrating the upper portion of our control valve and taken on line 4—4 of Figure 2.

Figure 5 is a plan section taken on line 5—5 of Figure 2.

In our above noted United States patent application, Serial No. 483,328, we have disclosed a fluid pressure actuated brake system for automobiles in which the clutch operating lever of the vehicle is adapted to control the operation of the vehicle brakes. In the present application we have illustrated a similar arrangement but it will be understood that any suitable means, such as a separate lever, may be utilized to impart the desired movement to the control apparatus. In Figure 1 we show a vehicle having a clutch operating lever or pedal 1 adapted to operate the vehicle clutch, diagrammatically shown at 2. The brake operating lever or pedal 3 is connected by suitable rods and etc. to operate the vehicle brakes, one of which is generally indicated at B, and includes the usual brake drum 4 and brake shoe or shoes 5. The operating cylinder of the fluid pressure actuated mechanism 6 carries a piston in the usual manner which is connected to a piston rod 7 which, in the installation shown, is pivotally secured at its outer end to the brake operating lever 3. It will be understood that although we have shown a cylinder and piston arrangement, a diaphragm chamber and diaphragm or other equivalent apparatus may be substituted therefor. The cylinder 6 is connected to our control valve, generally indicated at V, by a conduit 8 and a conduit 9 leads from the control valve to a suitable source of actuating fluid pressure such as the intake manifold 10 of the vehicle engine.

The valve V, as shown, is mounted in a vertical position on the dash board 11 of the vehicle and is provided with an operating rod 12 which extends out from the bottom of the valve housing. A coil spring 13 is secured to the lower end of the rod 12 and extends downwardly therefrom. At the lower end of the spring 13 we preferably provide a flexible cable or the like 14 which is provided at its lower end with an adjustable stop member 15. The cable 14 passes through a suitable aperture in the angle bracket 16 which is rigidly secured to the clutch operating lever 1 at 17.

Before going into the details of the construction of our control valve it will be well to give a general explanation of the apparatus thus far described. When the parts are in the position shown in Figure 1 it may be considered that the vehicle clutch pedal 1 has been depressed from its normal or clutch engaged position to a point where the vehicle clutch is completely disengaged. At this point the bracket 16 has been moved downwardly on the cable 14 until it is just striking the stop 15. Further movement of the clutch pedal 1 in clutch disengaging direction will cause a downward pull on the spring 13 which will operate the valve V to connect the intake manifold suction with the cylinder 6 and cause application of the vehicle brakes, as will be fully described later. When the operator removes his foot from the clutch pedal 1 it is returned to clutch engaged position by the usual clutch springs, etc., and, as the hole in the bracket 16 through which cable 14 extends is of sufficient size to permit free movement therebetween, the bracket 16 will merely slide up on the cable 14 without affecting the valve V. Thus, it will be seen that during the purely clutch operating movement of the pedal 1 the bracket 16 will slide up and down on the cable 14 without actuating the valve V but that, after the clutch is disengaged, further downward movement of the clutch pedal 1 will operate the valve V to control the vehicle brakes in the desired manner.

Referring now to Figures 2, 3 and 4, the valve V comprises a housing having an upper cylindrical portion 18 and a lower, somewhat enlarged, diaphragm chamber portion 19. A double ended piston type closure member C is adapted to move freely in the cylindrical portion 18 of the valve housing and is provided with an upper closure member 20 which is adapted to control the connection of the cylinder 6 to the atmosphere and a lower closure member 21 which is adapted to control the connection of the cylinder to the source of vacuum, in the present case, the intake manifold 10.

The two closure members 20 and 21 are connected by a central portion 22 of reduced cross sectional area and the piston member C is provided with an upwardly extending bore 23 into which the upper end of the rod 12 extends. As is clearly seen in Figure 4 the upper end of the rod 12 is pivotally connected to the piston closure member C by means of a pin 24. This pivoted connection of the rod 12 to the closure member C permits a relatively small degree of movement therebetween and eliminates the necessity of absolute accuracy in guiding the rod 12. This is helpful in that it prevents the apparatus from getting out of adjustment and eliminates the necessity of extremely close manufacturing tolerances such as would be required if the piston closure member C and the rod 12 were rigidly connected.

The diaphragm chamber portion 19 of the valve housing is provided with an end cap 25 which has threaded engagement with the main housing and is adapted to clamp the outer periphery of a diaphragm 26. The diaphragm 26, which is preferably of rubber or other similar flexible material, is secured to the rod 12 by the shoulder member 27 and the threaded clamping member 28. Between the clamping member 28 and the end wall of the cap 25 is a spring 29 which normally holds the diaphragm 26 and the piston closure member C in the positions shown in Figure 2. To secure the most sensitive valve action the strength of the spring 29 is preferably slightly more than enough to support the weight of the parts attached to the rod 12 when the bracket 16 is out of engagement with the stop 15. The lower end of the rod 12 is guided by the bearing portion 30 of the cap 25. The diaphragm 26 divides the diaphragm chamber into two portions, the lower of which is connected to the atmosphere through the holes 31 in the end cap 25 and the upper portion of which is connected to the aperture 32 by means of a passage 33. The aperture 32, as shown in Figure 5, is an elongated slot which extends from the interior of the cylindrical portion 18 of the valve housing into the hose connecting member 34, from which the conduit or hose 8 extends to the cylinder 6. Thus, it will be seen that the chamber on the upper side of the diaphragm 26 will at all times be connected to the cylinder 6 and therefore will be subject to the same pressure conditions.

The upper end of the cylindrical portion 18 of the valve housing is closed by means of a cap member 35 which is formed with an integral supporting lug 36 which is provided with a suitable hole 37 for bolting the valve to the dash board of the vehicle, as seen in Figure 1.

An aperture 38 is formed in the side wall of the cylindrical chamber 18 just below the end cap 35 and establishes communication between the upper end of the cylindrical chamber 18 and the atmosphere. The lower end of the cylindrical chamber 18, below the piston closure member C, is also connected to the atmosphere through the hole 39. The atmospheric connection to the interior of the cylinder 18 between the closure members 20 and 21, is provided by a circumferentially extending slot 40. As seen in Figure 3 this slot 40 extends around substantially one-half of the circumference of the valve housing and thus an atmospheric connection of large cross sectional area is provided. From the end 41 of the slot 40 a groove 42 is formed in the inner wall of the housing 18 and extends around to the opposite end 43 of the slot 40. A similar groove 44 extends around the inner wall of the cylindrical casing 18 at the aperture 32.

A suitable nipple 45 forms a connection for the conduit 9 and an elongated communicating passage 46, generally similar to passage 32, extends through the wall of the chamber 18 into the interior thereof. An annular groove 47 extends around the inner wall of the cylinder 18 from the passage 46. The purpose of the three annular grooves 42, 44 and 47 is to cause the fluid pressure, whether atmospheric or operating, to be applied equally around the closure members 20 and 21 and to thus eliminate any tendency for piston C to be forced to one side or the other of the housing 18 by the fluid pressure. The only resistance to movement of the piston member C within the cylindrical chamber 18 other than that required imposed by springs 13 and 29 and diaphragm 26, will be the ordinary wall friction of the walls of the chamber 18 and there will be n variation in the friction of the member C with variations in the pressure applied through the openings 32, 40 and 46. This annular groove passage arrangement is of particular importance in a valve of this type which must have a few variable factors affecting it as possible in order to secure the proper results.

The operation of our improved valve to control the application of the vehicle brakes is as follows:

In Figure 1 the parts are shown in the position they assume when the vehicle brakes are released. In this position the conduit 8, and consequently the cylinder 6, are connected to the atmosphere through the nipple 34, the aperture 32, the interior of the cylindrical housing 18 and the slotted aperture 40. Now, if a downward pull is exerted on the cable 15 the spring 13 will be placed in tension and the rod 12, the diaphragm 26 and the closure member C will be moved downwardly. The first portion of the downward movement of the piston member C will cause the portion 20 thereof to close the slot 40 and thus disconnect the cylinder 6 from the atmosphere. After the slot 40 is closed a slight further downward movement of the piston member C will cause the upper face of the closure member 21 to move below the upper edge of the slotted aperture 46 and communication will be established between the cylinder 6 and the intake manifold suction through the conduit 8, the nipple 34, the aperture 32, the interior of the cylindrical chamber 18, the aperture 46, the nipple 45 and the conduit 9. When this occurs the pressure will be reduced within the cylinder 6 and the piston will be moved downwardly to apply the vehicle brakes. At the same time the pressure will be reduced on the upper side of the diaphragm 26 because of the connection 33. When the reduction in pressure on the upper side of the diaphragm 26 becomes sufficiently great the differential between the reduced pressure on the upper side and the atmospheric pressure on the lower side of the diaphragm 26 will be sufficient to overcome the spring 13, and the diaphragm 26, together with the rod 12 and piston member C, will move upwardly until the closure 21 closes off the slotted opening 46 and thus breaks the connection to the intake manifold. When this occurs the pressure conditions which maintain within the cylinder 6 will remain constant until an additional tension is put on the spring 13 causing the vacuum connection to again be opened, or until the tension on the spring 13 is relieved permitting the atmospheric connection to the cylinder to be opened.

By providing the enlarged diaphragm 26 we are able to use a relatively stiff spring 13 and thus secure a more rugged apparatus and also a control arrangement which responds very quickly to movements of the operating lever. Inasmuch as the grooves 42, 44 and 47 prevent any tendency toward binding of the piston member C within the cylinder 18 they eliminate the necessity of extremely accurate fitting of these parts, thus making an apparatus which may be more economically constructed and which also is not affected by ordinary wear. As the degree of vacuum applied through the passage 46 has no effect upon the movement of the valve closure member C it will be seen that our valve mechanism will always respond in the same manner regardless of the portion of its stroke in which it is operating. By adjusting the position of the stop member 15 on the cable 14 the brake controlling mechanism may be made operative during any desired portion of the movement of the controlling pedal.

As the spring 13 is relatively stiff a certain additional resistance to downward movement of the pedal 1 will be imposed when the bracket 16 strikes the stop 15 and thus the operator of the vehicle will be given an indication when the pedal has reached the brake controlling portion of its stroke. The characteristics of the spring 13 are preferably such that the initial tension on the spring 13, which is caused by the bracket 16 just resting against the stop 15, will create and maintain pressure conditions within the cylinder 6 which will just take up the slack in the brake connections and bring the brake shoes in contact with the brake drums without, however, creating any noticeable braking effect.

Thus, in operating the vehicle the driver will disengage his clutch by pushing down on the pedal 1 until he feels the bracket 16 just strike the stop 15. This striking action will operate the control valve V to place the brake linkage and shoes in condition for immediate operation and any further downward movement of the pedal 1 will cause a corresponding braking force to be applied to the brake drums.

Although we have described the illustrated embodiment of our invention in considerable detail it will be understood that modifications and variations may be made therein without departing from the spirit of our invention. For example, by changing the characteristics of the spring 13 the same apparatus may be adapted for use on vehicles of many different types having a number of different braking arrangements. By using a spring 13 of proper strength the maximum braking force which can be exerted by the cylinder and piston may be controlled and, by varying the strength of the spring 13, this maximum braking force may be varied for different types of vehicles. We do not, therefore, limit ourselves to the specific apparatus shown and described but claim as our invention all embodiments thereof coming within the scope of the appended claims.

We claim:

1. In combination in a control valve for controlling the application of actuating pressure to a cylinder or the like, a cylindrical housing having a plurality of fluid passages extending through its side walls, a piston closure member in said cylindrical housing and means for moving said closure member to control the flow of fluid through said passages, said closure member moving means including a diaphragm housing at one end of said cylindrical housing and disposed coaxially therewith, a flexible diaphragm in said housing, connections between said diaphragm and said closure member, said diaphragm being exposed on one side to the atmosphere and on the other side to the effective fluid pressure in said cylinder, spring means for normally maintaining said diaphragm and closure member in off position and operating means for moving said diaphragm and closure member into open position, said means including a resilient member adapted to impose a load on said diaphragm when the operating means are moved to open the valve, said imposed load being opposed by the action of the pressure differential created by the opposite sides of said diaphragm when the valve is opened.

2. A control valve for fluid pressure actuated devices comprising a housing having a cylindrical portion and a diaphragm chamber portion, said cylindrical portion and diaphragm chamber portion having a common end wall, a diaphragm in said diaphragm chamber, a rod secured to said diaphragm and extending therefrom into said cylindrical portion through said common end wall, a piston secured to said rod and disposed within said cylindrical portion, said piston including a pair of connected closure members, one of said closure members being adapted to control an atmospheric connection to the interior of said cylinder and the other of said closure members being adapted to control an actuating fluid pressure connection to the interior of said cylindrical portion, said cylindrical portion being provided with an operating pressure port between said closure members adapted to be connected to the fluid pressure actuated device, a fluid conducting passage extending from the interior of said cylinder between said connected closure members to one side of said diaphragm, the opposite side of said diaphragm being exposed to the atmosphere, a spring secured to the end of said rod and means for applying a valve operating force to said rod through said spring.

3. A control valve for fluid pressure operated devices comprising a housing having cylindrical chambers arranged in end to end relation and having a common end wall therebetween, a piston type valve closure member in one of said chambers, means movable by fluid pressure in the other chamber, fluid pressure conducting connections whereby said movable means will be acted on by the fluid pressure supplied to the fluid pressure operated device, an operating rod connecting said closure member and said means movable by fluid pressure, said rod extending through said common end wall and also extending outwardly of said housing from said fluid pressure movable means, a spring associated with the outwardly extending portion of said rod, and means for applying a valve operating force to said rod through said spring.

4. A control valve for fluid pressure actuated devices, comprising a housing having a cylindrical bore portion and a diaphragm chamber portion, a diaphragm in said diaphragm chamber, a rod adapted to be moved by said diaphragm, and extending from said diaphragm chamber into said cylindrical bore portion, a piston valve member secured to said rod and disposed within said cylindrical bore portion, said piston member including spaced, connected closure members, one of said closure members being adapted to control an atmospheric connection to the interior of said cylindrical bore and the other of said closure members being adapted to control an actuating fluid pressure connection to the interior of said cylindrical bore, said cylindrical bore portion being provided with an operating pressure port between said closure members adapted to be connected to the fluid pressure actuated device, a fluid conducting passage extending from the interior of said cylindrical bore between said connected closure members to one side of said diaphragm, the opposite side of said diaphragm being exposed to the atmosphere.

FREDERICK G. FOLBERTH.
WILLIAM M. FOLBERTH.